Sept. 3, 1957
R. W. KREBS
2,805,177
PRODUCTION OF HYDROGEN AND COKE
Filed June 2, 1954
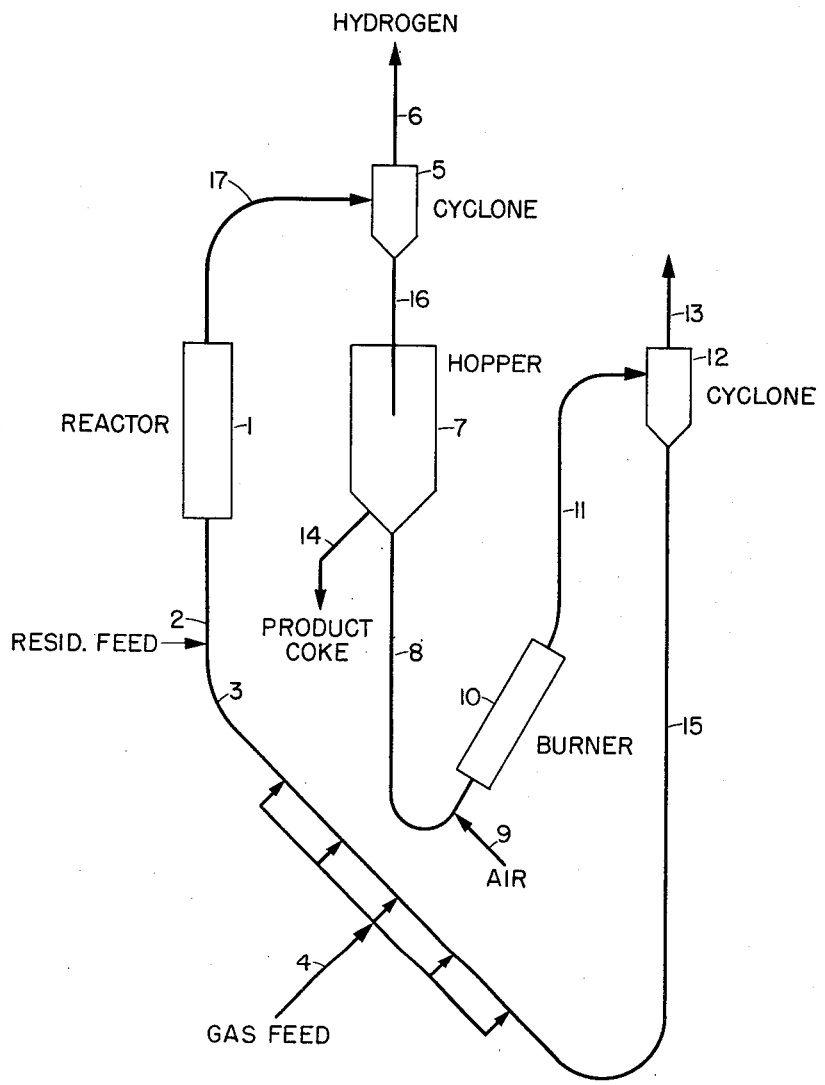
ROBERT W. KREBS, INVENTOR.
BY L. Chason

United States Patent Office 2,805,177
Patented Sept. 3, 1957

2,805,177

PRODUCTION OF HYDROGEN AND COKE

Robert W. Krebs, Baton Rouge, La., assignor to Esso Research and Engineering Company, a corporation of Delaware Application June 2, 1954, Serial No. 433,986

4 Claims. (Cl. 23—212)

This invention relates to improvements in the cracking of gaseous hydrocarbons over coke particles by the addition of heavy hydrocarbon oils.

It is well known that methane or other hydrocarbon gases can be cracked at high temperatures, e. g. 1700° F. to 2500° F. to form products consisting largely of hydrogen and carbon. When an activated surface such as activated carbon is present, good reaction velocities can be obtained at several hundred degrees F. lower temperature. Without catalyst, around 2000° F. reaction temperature for 1–10 seconds is required.

The process is readily conducted using the fluid solids technique, particularly with the so-called transfer line reactor. One great disadvantage of this technique is that the carbon that is formed is in the form of a fine powder which is hard to recover and fouls product recovery equipment.

This invention provides an improved method of obtaining hard coke of relatively large particle size along with hydrogen as a product. This is effected by introducing, along with the hydrocarbon gas feed or separately to the reaction zone, a residual hydrocarbon oil having a high Conradson carbon value, i. e., 10% or more, over a fluidized bed of coke particles. Specific operating ranges are provided in greater detail below but the process is carried out at a minimum temperature of 1700° F. The ratio of residual oil to feed gas may be varied over a wide range as desired or as indicated by the economics of the process but at least 20% of the total weight of the hydrocarbon gas feed is residual oil. By this technique the dusty carbon black product is incorporated with the hard coke from the residue to form a useful, recoverable coke product along with a hydrogen-rich gas.

Operations at the high temperature of this invention produce hydrogen rather than aromatics and olefins. At least 70 vol. percent and usually at least 85 vol. percent of the effluent is hydrogen. The products of this invention are thus predominantly hydrogen and coke. This should be contrasted with the lower temperature same contact time treating of hydrocarbon oils, e. g., a temperature of 1400° F. or less. The latter process gives a maximum hydrogen content in the effluent of about 20 vol. percent.

Normally gaseous hydrocarbons that can be used include saturated and unsaturated gaseous hydrocarbons, such as methane, ethane, propane, ethylene, propylene, etc.

Heavy hydrocarbon oil feeds suitable for the coking process are heavy or reduced crudes, vacuum bottoms, pitch, asphalt, other heavy hydrocarbon residua or mixtures thereof. Typically, such feeds can have an initial boiling point of about 700° F. or higher, an A. P. I. gravity of about 0° to 15° or even heavier, e. g. 1.9°, and a Conradson carbon residue content of at least 10 weight percent, i. e. about 10 to 40 weight percent. (As to Conradson carbon residue see ASTM Test D–180–52.)

It is preferred to operate with coke particles having an average particle size ranging between 100 and 1000 microns in diameter with a preferred particle size range between 150 and 400 microns. Preferably not more than 5% has a particle size below about 75 microns, since small particles tend to agglomerate or are swept out of the system with the gases.

Product coke of the desired size within the preceding range can be withdrawn. It is preferred to withdraw material over 200 to 500 microns.

This invention will be better understood by reference to an example and the flow diagram shown in the drawing.

In the drawing conduit 1 is a transfer line reactor through which the reactant system flows in the form of a high velocity confined stream. A heavy oil feed, about 3 lbs of vacuum residuum from Elk Basin crude, having a Conradson carbon number of 30%, preheated to a temperature of 500° F. enters the transfer line reactor through lines 2 and 3. Normally gaseous hydrocarbon feed, e. g., about 16 lbs. of natural gas consisting largely of methane, at a temperature of 100° F., is preferably injected through a plurality of points 4 and through 3 to reactor 1. Hot coke at a temperature of 2300° F. is transported through line 3 and the transfer line reactor at high velocity by the hydrocarbon gas, e. g. 10 ft./sec. so that the contact time is 5 seconds and the temperature is 2100° F. A transfer line reactor is preferred but a dense turbulent fluidized bed reactor can also be utilized. The reaction system is thus maintained in reactor 1 for a period of time sufficient to obtain the desired reaction while the coke is in the form of a fluidized stream. In the reactor 1 hydrogen is evolved and the residuum feed is cracked and the carbon produced in the process is coated on the solid coke particles. The reaction products, about 95 vol. percent hydrogen, together with other vaporous products including only a small amount of uncracked methane, ethane, nitrogen, etc., are then sent through line 17 into cyclone 5, a solid/vapor separating device. The gaseous products are taken off overhead through line 6, whereas the hot coke discharges through line 16 into hopper 7.

Coke is withdrawn from hopper 7 through standpipe 8 and transported by air or other oxygen-containing gas from line 9 into conduit 10, a transfer line burner. A fluidized burner could be used. The coke is thus fluidized while maintained in the form of a high velocity confined stream. The temperature of the coke is raised to 2300° F. so as to supply heat for the reaction, the velocity in the transfer line burner is 25 ft./sec. and the residence time is 2 seconds. The coke and flue gases are sent through line 11 into cyclone 12 or other solid/vapor separating device. The hot coke is recycled through standpipe 15 to reactor 1 as explained above and the flue gases leave the system through line 13. Product coke is withdrawn through line 14 but can be taken off on the burner side.

On the basis of a pound-mol of methane fed to the process, about 750 cubic feet of hydrogen is produced along with 13 lbs. of carbon. Three pounds of carbon are burned in vessel 10 to furnish heat for the process. With the burner operating at 2300° F. and the reactor at 2100° F., about 1200 lbs. of coke is recirculated per mol of methane fed, which at the conditions in the reaction vessel, represents a concentration of about two lbs. of solids per cubic foot of feed gas.

It is also possible to operate producing hydrogen, with only sufficient gas for carrying the solids, so that the bulk of the hydrogen is produced from the liquid residuum, or from lighter oils which can be added. In order to reduce the amount of gas needed for carrying the solids it is possible to operate the reactor at low pressure, near atmospheric pressure. The gas requirement is further reduced by lowering the solids circulation rate. This is effected by increasing the burner temperature so that the heat content of a given weight of solids is increased. Still another method is to lower the reactor temperature and increase the reactor volume so as not to affect the degree of conversion. By this means, more oils can be added as reactants.

These additional oils may be light stocks, provided that sufficient heavy oil is added so that the fixed or Conradson carbon content of the oil feed is 5% or more of the weight of the total carbon production. By light stocks are means petroleum fractions boiling in the gas oil range or lower. The light oil can be added to or substituted for the residual oil within the ranges stipulated therefor and the expressed Conradson carbon requirement.

In order to explain this invention more fully, the following conditions of operation of the various components are set forth below.

*Conditions in fluid reactor*

|  | Broad Range | Preferred Range |
|---|---|---|
| Temperature, °F | 1,700–2,500 | 1,800–2,100 |
| Superficial Velocity of Fluidizing Gas for Fluid Reactor, ft./sec | 0.3–10 | 0.5–5 |
| Superficial Velocity of Fluidizing Gas in Transfer Line Reactor, ft./sec | 5–40 | 10–25 |
| Relationships of heavy oil feed/hydrocarbon gas, wt | 1/5–10/1 | 2/5–2/1 |
| Contact Time, sec | 0.2–100 | 0.5–30 |

*Conditions in burner*

|  | Broad Range | Preferred Range |
|---|---|---|
| Temperature, °F | 1,800–2,600 | 1,900–2,400 |
| Superficial Velocity of Fluidizing Gas in Transfer Line Burner, ft./sec | 10–60 | 10–30 |
| Superficial Velocity of Fluidizing Gas in Fluid Burner, ft./sec | 0.3–10 | 0.5–5 |

The advantages of the process of this invention will be apparent to the skilled in the art. The selectivity to predominantly large particle size coke and hydrogen gives two products which have utility in other refinery operations or can be marketed as is.

Activated coke could also be used in the process.

It is to be understood that this invention is not limited to the specific examples which have been offered merely as illustrations and that modifications may be made without departing from the spirit of the invention.

What is claimed is:

1. A process for producing gaseous products containing at least 70 vol. percent hydrogen and product coke having a particle size diameter in the range of about 200 to 500 microns which comprises the steps of contacting a heavy hydrocarbon oil having a Conradson carbon residue content of at least 10% with an added normally gaseous hydrocarbon in a reaction zone at a temperature in the range of 1700° F. to 2500° F., the ratio by weight of the heavy hydrocarbon oil to the hydrocarbon gas utilized being in the range of 1/5 to 10/1 over fluidized coke particles having a diameter in the range of about 150 to 400 microns; maintaining the resultant reaction for a period of time sufficient to obtain the desired reaction; separating the gaseous products containing evolved hydrogen from the coke particles; burning a portion of the coke particles in a separate burning zone to increase the temperature thereof; separating gaseous combustion products from the heated coke, returning a portion of the heated coke particles to the reaction zone and withdrawing product coke.

2. The process of claim 1 in which the reaction zone is a transfer line reaction zone wherein the coke particles are at high velocity while in the form of a confined elongated stream.

3. The process of claim 1 in which the coke particles in the reaction zone are in the form of a dense turbulent fluidized bed.

4. The process of claim 1 in which light oil stock is also fed to the reaction zone, the Conradson carbon content of the combined oil feed being a minimum of 5% of the weight of the total coke production.

References Cited in the file of this patent

UNITED STATES PATENTS

| 1,717,354 | Burwell | June 18, 1929 |
| 2,445,328 | Keith | July 23, 1948 |
| 2,471,104 | Gohr | May 24, 1949 |
| 2,482,187 | Johnson | Sept. 20, 1949 |
| 2,662,005 | Evans | Dec. 8, 1953 |